(12) United States Patent
Kwon et al.

(10) Patent No.: US 10,365,144 B2
(45) Date of Patent: Jul. 30, 2019

(54) APPARATUS FOR PROVIDING CONTENTS AND METHOD FOR THE SAME

(71) Applicant: KOREA INSTITUTE OF SCIENCE AND TECHNOLOGY, Seoul (KR)

(72) Inventors: Yong-Moo Kwon, Seoul (KR); Jaehyuk Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 354 days.

(21) Appl. No.: 14/623,121

(22) Filed: Feb. 16, 2015

(65) Prior Publication Data

US 2015/0313387 A1 Nov. 5, 2015

(30) Foreign Application Priority Data

May 2, 2014 (KR) ........................ 10-2014-0053508

(51) Int. Cl.
| | | |
|---|---|---|
| *G01F 17/00* | (2006.01) | |
| *G01F 23/22* | (2006.01) | |
| *G06F 3/0484* | (2013.01) | |
| *G01F 22/00* | (2006.01) | |
| *A47G 19/22* | (2006.01) | |
| *G01F 23/00* | (2006.01) | |

(52) U.S. Cl.
CPC ......... *G01F 23/22* (2013.01); *A47G 19/2227* (2013.01); *G01F 22/00* (2013.01); *G01F 23/0076* (2013.01); *G06F 3/04842* (2013.01); *A47G 2019/2238* (2013.01); *A47G 2019/2244* (2013.01)

(58) Field of Classification Search
CPC ........ G01F 23/22; G01F 17/00; G01F 19/002; G01F 23/0076; G01F 22/00; A47G 19/2227; A47G 2019/2238; G06F 3/04842; G06F 3/0076
USPC .................................................... 73/149, 426
See application file for complete search history.

(56) References Cited

U.S. PATENT DOCUMENTS

| | | | |
|---|---|---|---|
| 6,675,646 B2 * | 1/2004 | Nishihara ............ | B41J 2/17566 347/7 |
| 6,840,100 B1 * | 1/2005 | Wotiz ....................... | A45F 3/16 222/175 |

(Continued)

FOREIGN PATENT DOCUMENTS

| | | |
|---|---|---|
| KR | 10-2004-0070886 A | 8/2004 |
| KR | 10-2006-0099374 A | 9/2006 |

(Continued)

*Primary Examiner* — Harshad R Patel
*Assistant Examiner* — Nigel H Plumb
(74) *Attorney, Agent, or Firm* — Goldilocks Zone IP Law

(57) ABSTRACT

A content providing apparatus may include a container capable of containing a consumable material, a sensor to measure an amount of a consumable material contained in the container, a content output control unit configured to control an output of a content to be provided based on the amount of the consumable material measured by the sensor, and a content output unit configured to output the content with the output controlled by the content output control unit. Also, a content providing method may include measuring an amount of a consumable material contained in a container, determining an output of a content to be provided based on the measured amount of the consumable material, and providing the content with the determined output.

11 Claims, 7 Drawing Sheets

(56) References Cited

U.S. PATENT DOCUMENTS

| | | | | |
|---|---|---|---|---|
| 8,550,288 B2* | 10/2013 | Briar | ...................... | B65D 25/02 |
| | | | | 137/386 |
| 2002/0126851 A1* | 9/2002 | Lo | ...................... | A47G 19/2227 |
| | | | | 381/61 |
| 2006/0000277 A1* | 1/2006 | Pietrorazio | ............. | G01F 22/00 |
| | | | | 73/293 |
| 2010/0025267 A1* | 2/2010 | Brand | ................ | A47G 19/2227 |
| | | | | 206/216 |
| 2010/0101317 A1* | 4/2010 | Ashrafzadeh | ....... | G01F 23/0061 |
| | | | | 73/149 |
| 2013/0127748 A1* | 5/2013 | Vertegaal | ........... | A47G 19/2227 |
| | | | | 345/173 |

FOREIGN PATENT DOCUMENTS

| | | |
|---|---|---|
| KR | 10-2007-0019427 A | 2/2007 |
| KR | 10-2010-0046403 A | 5/2010 |
| KR | 10-2012-0092166 A | 8/2012 |
| KR | 10-2014-0010237 A | 1/2014 |
| KR | 10-2014-0023430 A | 2/2014 |
| WO | 2008/011297 A2 | 1/2008 |
| WO | 2011/067232 A1 | 6/2011 |

* cited by examiner

APPARATUS FOR PROVIDING CONTENTS AND METHOD FOR THE SAME

CROSS-REFERENCE TO RELATED APPLICATION

This application claims priority to Korean Patent Application No. 10-2014-0053508, filed on May 2, 2014, and all the benefits accruing therefrom under 35 U.S.C. § 119, the contents of which in its entirety are herein incorporated by reference.

BACKGROUND

1. Field

Exemplary embodiments relate to an apparatus and a method for providing contents, and more particularly, to an apparatus and a method that provide contents with an output adjusted based on an amount of consumable material in a container.

2. Description of the Related Art

Consumers can purchase not only tangible products but also intangible experiences. For example, in the case of a purchase of a performance ticket, a form of purchasing the ticket, i.e., a tangible product is assumed. However, the essence lies in purchasing the performance, i.e., an experience.

When a consumer purchases an experience, the consumer may share the purchased experience with one or more other people. In contrast, when a consumer purchases a product, the consumer usually cannot share the purchased product with other people and often consumes the product by himself/herself. Generally, it is reported that people feel happier when they share purchased products with other people than when they do not so. However, unlike products, experiences leave memories or feelings over time but they are intangible, and thus, according to a survey result, it is found that people think purchasing products is rather a better consumption.

Now, there is a question about whether purchasing a product can provide an experience. Here, the "experience" refers to an optimum environment for enjoying the product. For example, according to a research result, a degree of concentration of the human is found highest in a moderately noisy environment not causing distraction, compared to when there is too little noise or too much noise around. Thus, people gather together to promote friendship or work or study in coffee shops while not only drinking coffee but also enjoying contents being provided in the coffee shops, for example, the atmospheres inside the coffee shops such as background music, fragrances and lighting. On the other hand, coffee shops serve customers inside the coffee shops beverages such as coffee, lighting creating the atmosphere and contents such as music as well. That is, coffee shops give customers who purchase beverages the rights to experience particular contents together. However, if customers leave coffee shops after purchasing beverages (for example, take-out), the coffee shops cannot provide contents any longer. Also, the customers cannot have the rights to access to the contents.

In related arts providing contents through a tangible product, the contents may be provided in a continuous and consistent manner while a product is being used. However, in this case, because the content is constantly provided, there is a limitation on the extent to which a user feels a particular environment or experience.

Recently, more attention is being paid to the Internet of Things (IoT) that enables information sharing by interconnecting everyday objects using a wired/wireless network. However, a majority of services focus on devices such as smart phones and have a hand-operated and passive interface depending on user manipulation.

SUMMARY

According to one aspect of the present disclosure, a consumable material and a related content may be provided together, and the right to access to the content may also be controlled based on an amount of the consumable material consumed.

According to one aspect of the present disclosure, a user may be given a feeling as if the user is in a particular environment related to a product using a container containing a tangible material.

A content providing method and an apparatus for consuming contents with the consumption of a tangible material are provided.

A content providing apparatus according to an exemplary embodiment may include a container capable of containing a consumable material, a sensor to measure an amount of the consumable material contained in the container, a content output control unit configured to control an output of a content to be provided based on the amount of the consumable material measured by the sensor, and a content output unit configured to output the content with the output controlled by the content output control unit.

A content providing method according to an exemplary embodiment may include measuring an amount of a consumable material contained in a container, determining an output of a content to be provided based on the measured amount of the consumable material, and providing the content with the determined output.

The content providing apparatus according to one aspect of the present disclosure provides a consumable material together with a content to which the right of access changes with the consumption of the consumable material regardless of a place. Accordingly, a contents market may be activated.

The content providing apparatus according to one aspect of the present disclosure allows a user of the content providing apparatus to feel an environment or an atmosphere of inside of a place where the content providing apparatus is used, even if the user does not actually go to the place. Thus, the user may have a realistic feeling of consumption of the content while the user is using the apparatus.

The content providing apparatus according to one aspect of the present disclosure may provide a user who is away from a place where the apparatus is used with a content being provided in the place in real time.

The content providing apparatus according to one aspect of the present disclosure may provide a user who is away from a place where the apparatus is used with an environment inside the place in the form of an image. Thereby, a feeling as if the user is in the place may be maximized and provided to the user.

The content providing apparatus according to one aspect of the present disclosure receives content from outside of the apparatus using a network and provides the received content. Accordingly, various types of contents as well as contents stored in the apparatus may be provided.

The content providing apparatus according to one aspect of the present disclosure allows a user to select an environment related to the content to receive. Thereby, the environment to create with the content may be controlled according to the user's taste or request.

DETAILED DESCRIPTION

Figure 1:
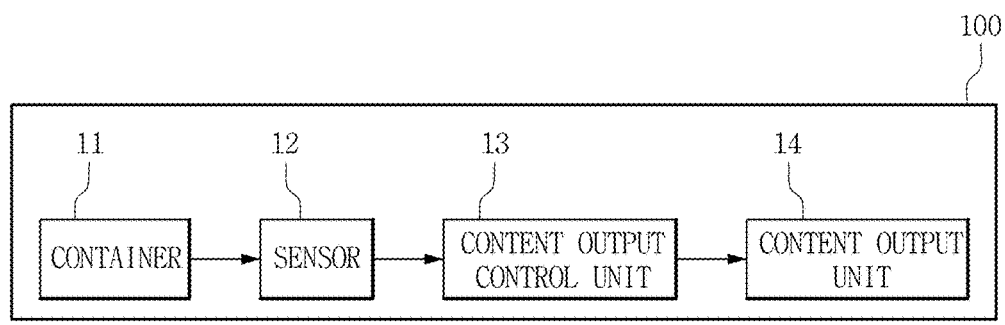
FIG. 1 is a block diagram illustrating an exemplary content providing apparatus according to an exemplary embodiment of the present disclosure.

It should be understood that the terminology used herein is for the purpose of describing particular embodiments only and is not intended to limit the present disclosure. Unless the contrary appears explicitly from the context, the singular shall include the plural.

Also, the size of each component in the drawings may be exaggerated for clarity and does not represent a size being actually applied. Like reference numerals presented in the drawings represent like parts.

Also, in the description of exemplary embodiments, when it is deemed that specific explanation of related well-known functions or constructions may obscure the essence of the invention, the detailed description is omitted.

Hereinafter, the exemplary embodiments of the present disclosure are described in detail with reference to the accompanying drawings.

FIG. 1 is a block diagram illustrating an exemplary content providing apparatus according to an exemplary embodiment. As shown in FIG. 1, the content providing apparatus 100 may include a container 11 capable of containing a consumable material, a sensor 12, a content output control unit 13, and a content output unit 14. The sensor 12 measures an amount of a material contained in the container 11. The content output control unit 13 may control an output of the content to be provided based on the amount of the material measured through the sensor 12. Here, the output of the content may be the magnitude of an attribute of the content. For example, the output of the content is the volume or the intensity of sound, the brightness of lighting or the strongness of fragrance. The content output unit 14 may output the content with the output controlled by the content output control unit 13.

The consumable material includes any material having an attribute of wearing out by consumption. The consumable material may be liquid or solid, for example, a beverage or an ink.

The content providing apparatus 100 may have a container 11 to contain the consumable material therein. The content providing apparatus 100 may be, for example, a cup, a tumbler, a bottle, a glass, dinnerware, or an ink cartridge.

The content output control unit 13 may gradually control the output of the content based on the amount of the consumable material measured by the sensor 12. For example, when the amount of consumable material measured by the sensor 12 is smaller than an amount of consumable material previously measured, the content output control unit 13 reduces the output of the content. In contrast, when the amount of consumable material measured by the sensor 12 is larger than the amount of consumable material previously measured, the content output control unit 13 increases the output of the content to be provided. For example, the content output control unit 13 may control the output of the content in proportion to the amount of consumable material remained in the container 11. When the consumable material is used up, the content output control unit 13 may control the output of the content so that the content is not provided. For example, in the case where the content providing apparatus 100 is a tumbler, a user of the tumbler feels that a content being provided reduces in output as the user drinks. Thus, the user may experience the consumption of the content.

The content to provide may be at least one of sound, an image, fragrance, and lighting. For example, the content may be the sound a coffee shop provides, or music in product advertising. Also, the content may be an educational content useful for the user of the content providing apparatus 100.

The content output unit 14 may be at least one of a speaker, a display, a fragrance spray, and a lighting device, depending on the content to provide. The content output unit 14 may output the content stored in the content providing apparatus 100.

In an exemplary embodiment, the content providing apparatus 100 may sense whether the consumable material is used up based on the Internet of Things (IoT), without a separate user manipulation. Accordingly, the content providing apparatus 100 may automatically control the output of the content and provide the content.

Figure 2:
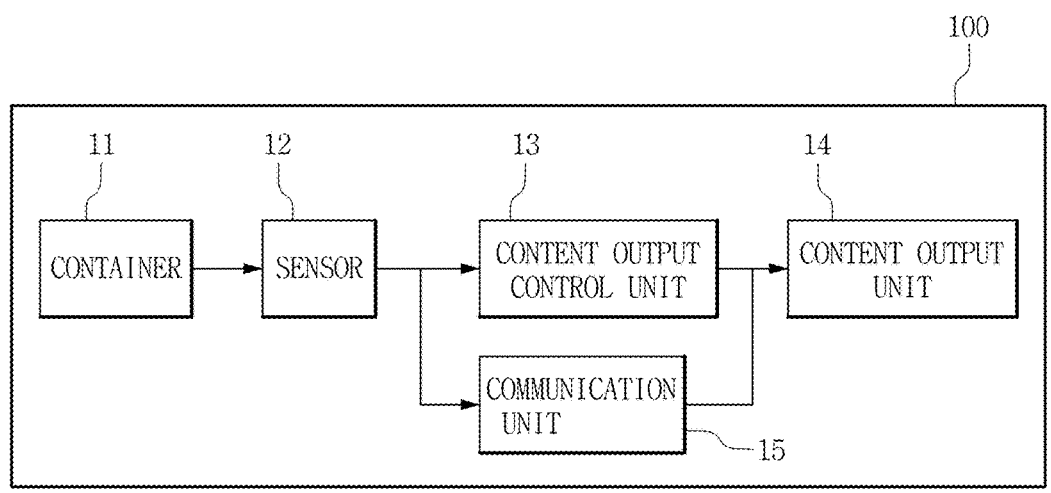
FIG. 2 is a block diagram illustrating an exemplary content providing apparatus according to an exemplary embodiment of the present disclosure.

FIG. 2 is a block diagram illustrating an exemplary content providing apparatus according to an exemplary embodiment. As shown in FIG. 2, the content providing apparatus 100 may further include a communication unit 15. The communication unit 15 may receive a content to provide from outside using a wired or wireless network and transmit the received content to the content output unit. In this instance, the communication unit 15 may receive a content being provided in a particular environment in real time and transmit the content to the content output unit 14. Accordingly, the user may receive the content being provided in the external environment in real time and have an experience as if the user is in such an environment.

Figure 3:
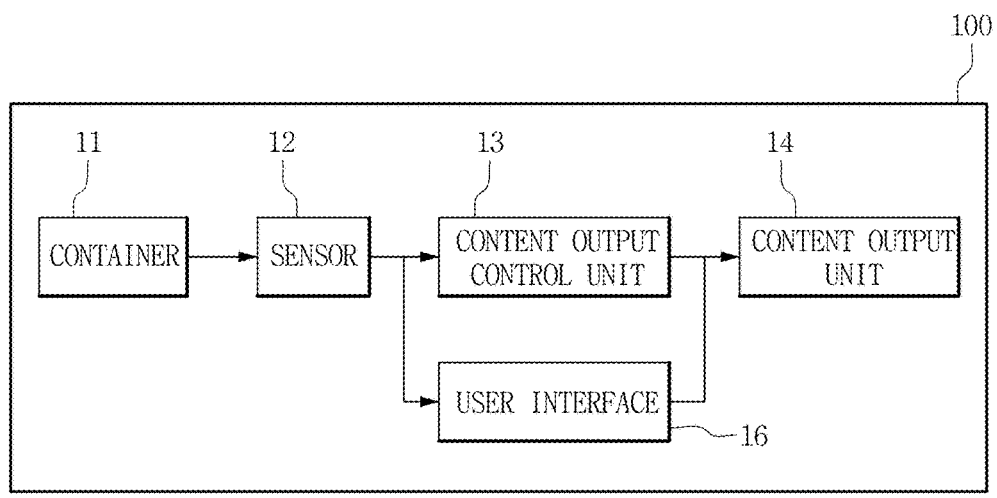
FIG. 3 is a block diagram illustrating an exemplary content providing apparatus according to an exemplary embodiment of the present disclosure.

FIG. 3 is a block diagram illustrating an exemplary content providing apparatus according to an exemplary embodiment. As shown in FIG. 3, the content providing apparatus 100 may further include a user interface 16. The user interface 16 may allow the user to select a particular environment related to the content or the consumable material. Accordingly, a content associated with an environment desired by the user may be provided. Thus, the user may select an environment to experience through the content providing apparatus 100 depending on the user's taste. For example, the user may choose a content be provided which is related to the environment of a coffee shop in New York, U.S.A. or a coffee shop in Paris, France.

Figure 4:
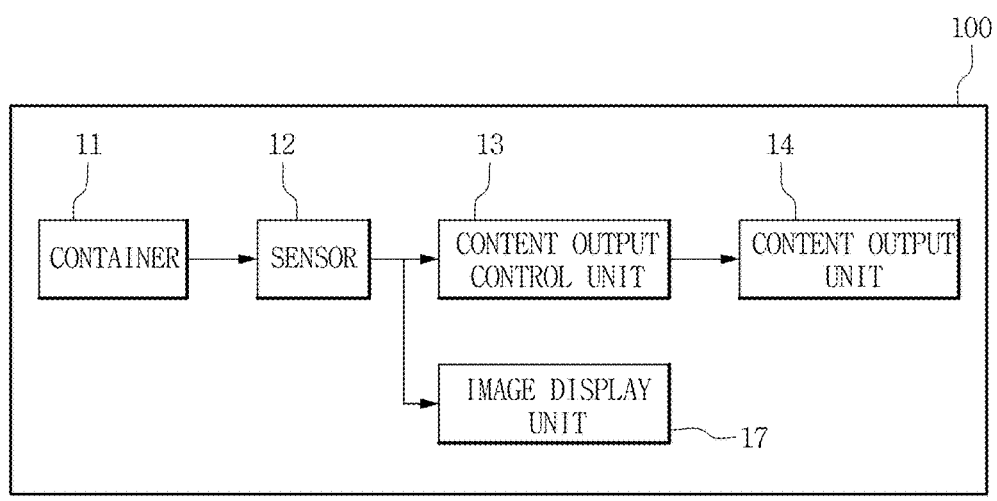
FIG. 4 is a block diagram illustrating an exemplary content providing apparatus according to an exemplary embodiment of the present disclosure.

FIG. 4 is a block diagram illustrating an exemplary content providing apparatus according to an exemplary embodiment. As shown in FIG. 4, the content providing apparatus 100 may further include an image display unit 17 to provide an image of the particular environment. The particular environment may be related to the consumable material contained in the container 11 or the content providing apparatus 100. The particular environment may be, for example, a coffee shop. Accordingly, the content providing apparatus 100 may provide the user with the sound being provided in the particular environment and a scene or sight thereof as well. Thus, the user may have a realistic feeling about an atmosphere there.

Figure 5:
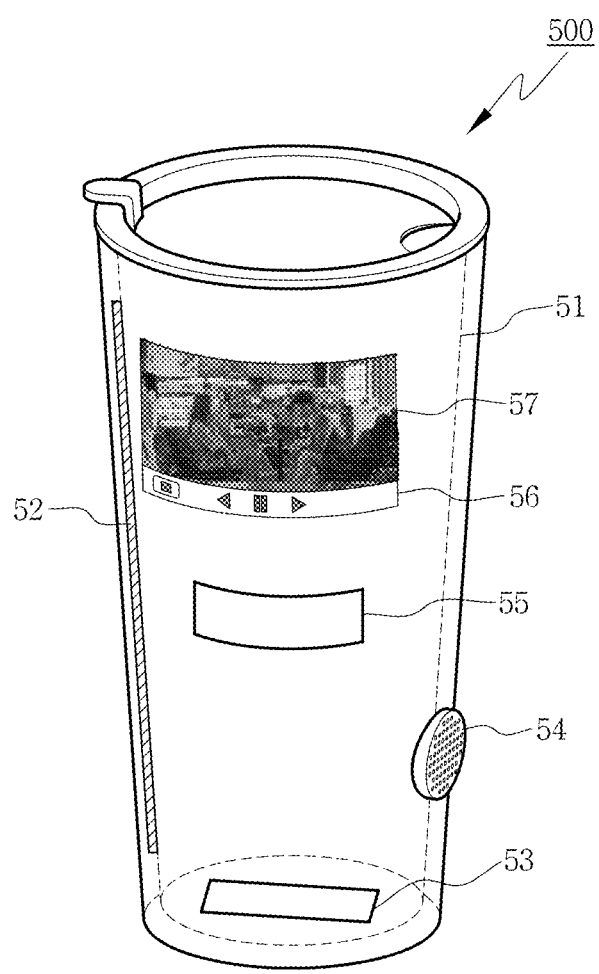
FIG. 5 is a schematic diagram illustrating an exemplary content providing apparatus according to an exemplary embodiment of the present disclosure.

FIG. 5 is a schematic diagram illustrating an exemplary content providing apparatus according to an exemplary embodiment. As shown in FIG. 5, the content providing apparatus 500 may be a tumbler. A container 51 may be a cup that contains a beverage. A sensor 52 may be installed to measure an amount of the beverage contained in the cup. A content output control unit 53 may be connected to a content output unit 54 to control an output of a content to be provided. The content output unit 54 may be a speaker. A communication unit 55 included in the content providing apparatus 500 may receive the content through communication with outside, for example, a network or a content server of a particular coffee shop. Also, a user interface 56 may include, for example, a touch pad or a button, to receive a user input. An image display unit 57 may display an interior scene of a particular environment, for example, a coffee shop. It should be noted that the arrangement of the components and the type of the apparatus shown in the drawings is only for illustration and are not intended to limit the present disclosure.

Figure 6:
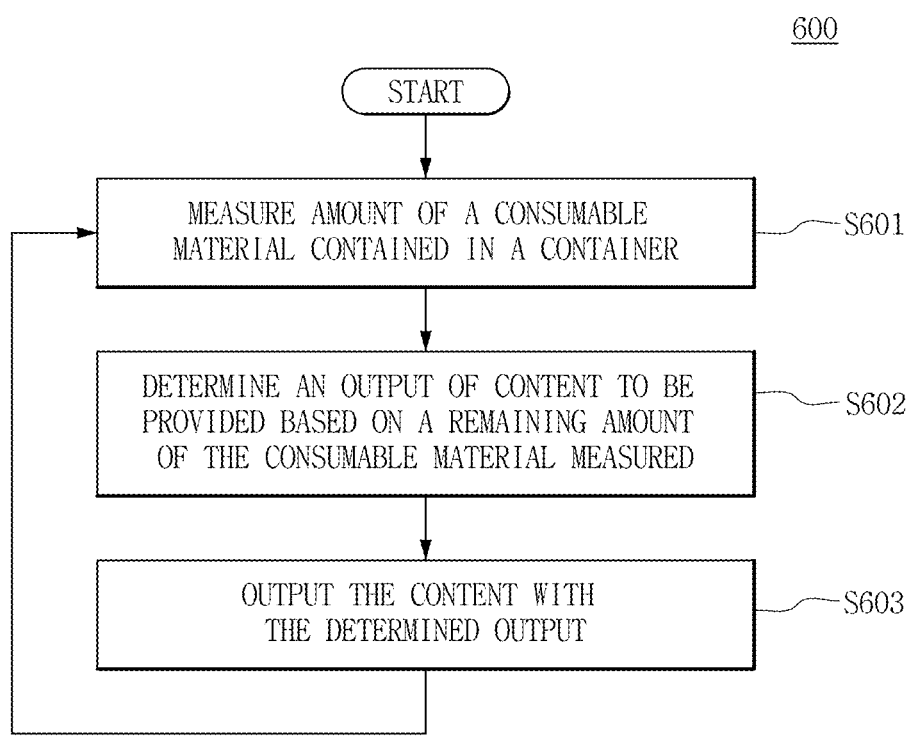
FIG. 6 is a flowchart illustrating an exemplary content providing method according to an exemplary embodiment of the present disclosure.

FIG. 6 is a flowchart illustrating a content providing method 600 according to an exemplary embodiment. When a container has a consumable material inside, the content providing method 600 may be started. As shown in FIG. 6, first, an amount of the consumable material contained in the container is measured (S601). After the measuring is completed, an output of a content to be provided is determined based on a remaining amount of the consumable material measured in the container (S602). Also, the content is outputted with the determined output (S603).

In an exemplary embodiment, the determining of the output of the content (S602) may include gradually changing the output of the content based on the measured amount of the consumable material. Also, the gradually changing of the output of the content based on the measured amount of the consumable material may include determining the output of the content in proportion to the measured amount of the consumable material remaining in the container.

Figure 7:
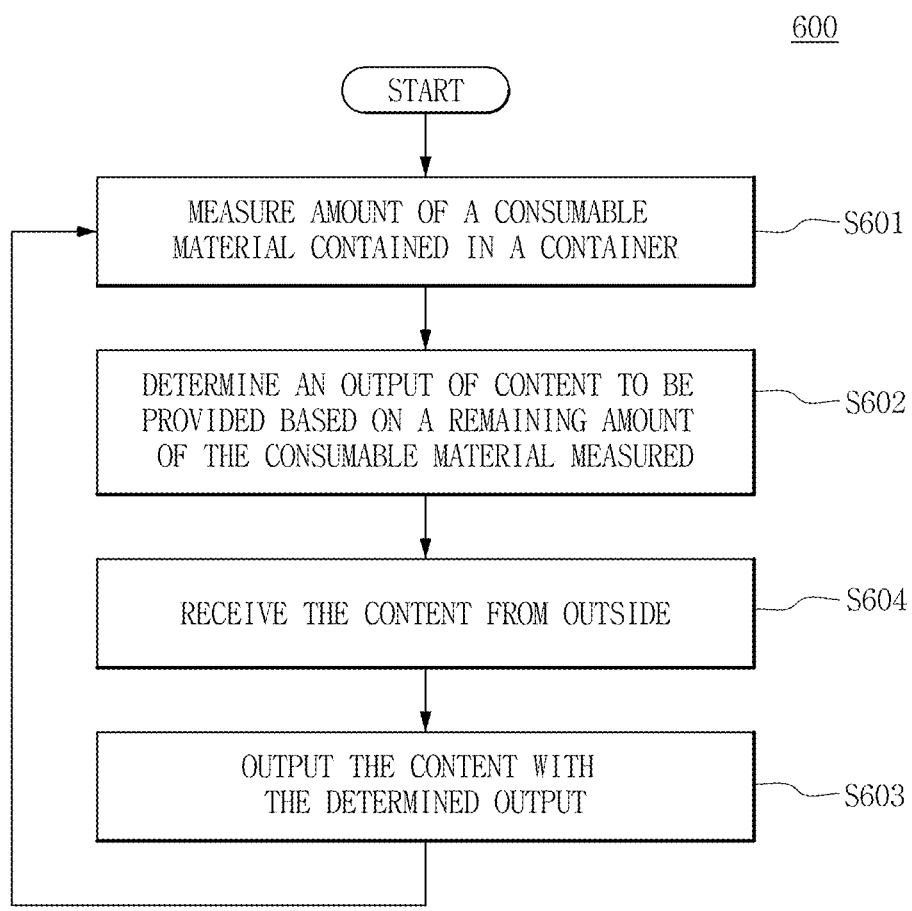
FIG. 7 is a flowchart illustrating an exemplary content providing method according to an exemplary embodiment of the present disclosure.

FIG. 7 is a flowchart illustrating the content providing method 600 according to an exemplary embodiment. As shown in FIG. 7, the content providing method 600 may further include, receiving the content from outside using a wired or wireless network (S604) before the outputting of the content with the determined output (S603). Also, the receiving of the content from the outside using the wired or wireless network (S604) may include receiving the content being provided in a particular environment in real time.

Figure 8:
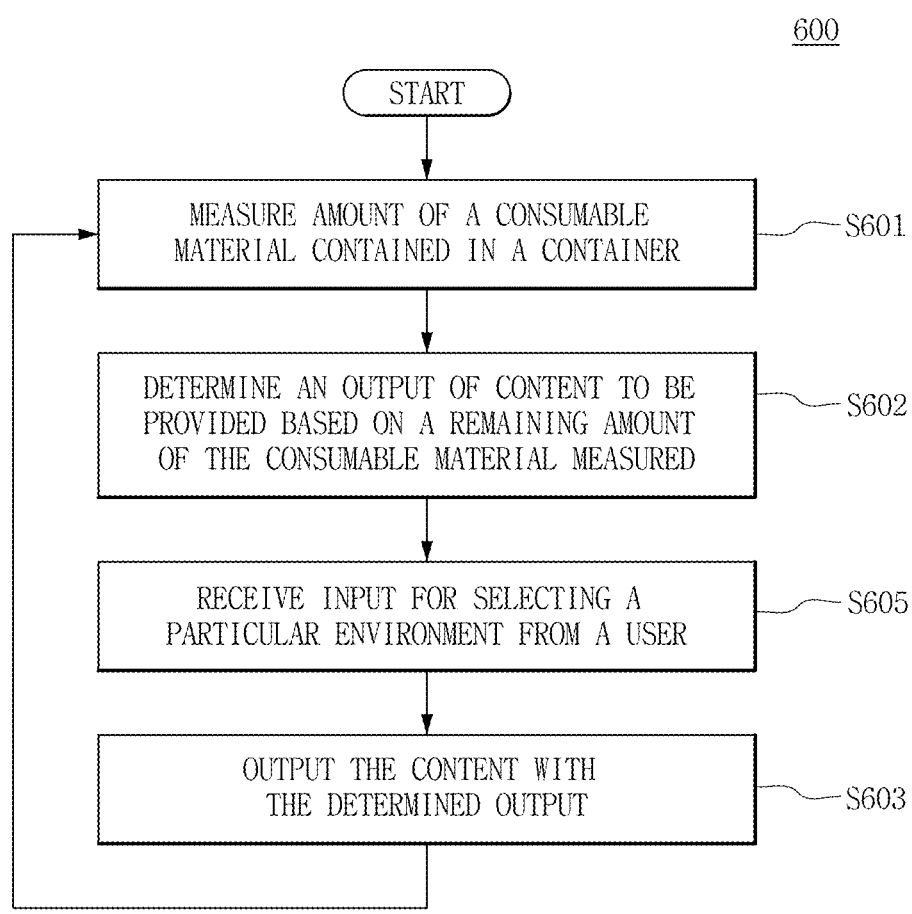
FIG. 8 is a flowchart illustrating an exemplary content providing method according to an exemplary embodiment of the present disclosure.

FIG. 8 is a flowchart illustrating the content providing method 600 according to an exemplary embodiment. As shown in FIG. 8, the content is related to a particular environment, and the content providing method 600 may further include receiving an input for the particular environment from a user (S605).

Figure 9:
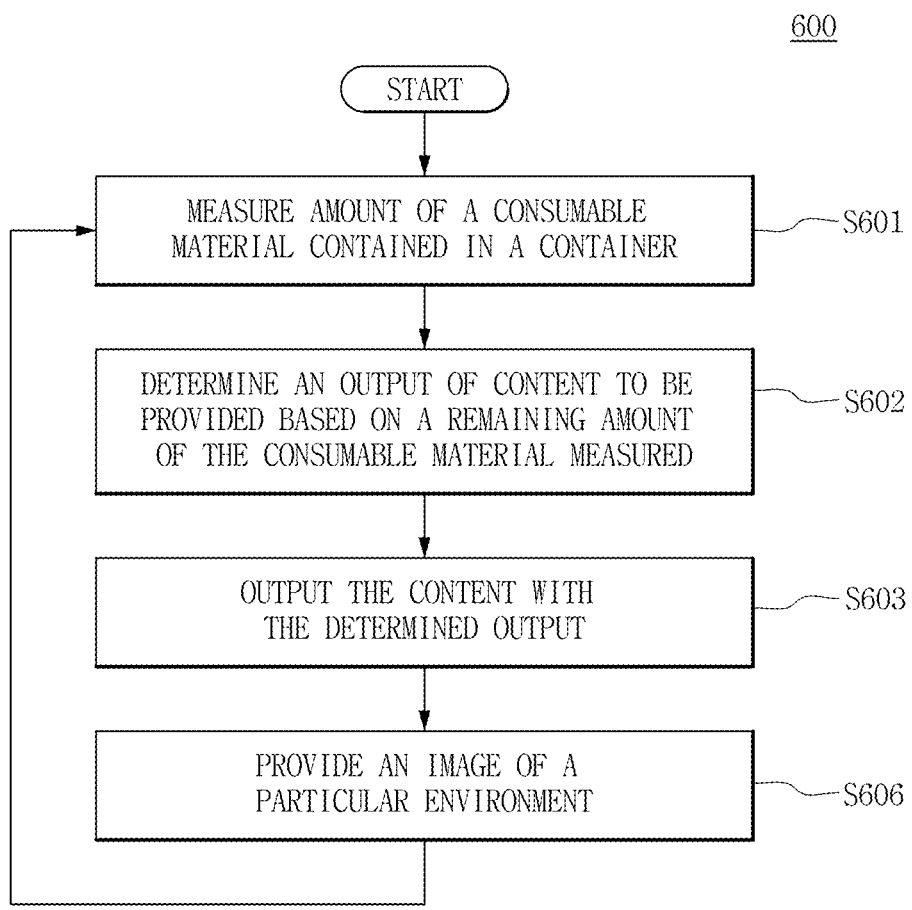
FIG. 9 is a flowchart illustrating an exemplary content providing method according to an exemplary embodiment of the present disclosure.

FIG. 9 is a flowchart illustrating the content providing method 600 according to an exemplary embodiment. As shown in FIG. 9, the content providing method 600 may further include providing an image of the particular environment related to the consumable material in the content providing apparatus or the container (S606).

When the user purchases the content providing apparatus according to an exemplary embodiment of the present disclosure, the user may purchase an experience in the particular environment related to the content providing apparatus together. Also, as the user consumes the consumable material contained the content providing apparatus, the user may experience the consumption of the content. For example, even if the user is not in a coffee shop, the user is provided with music being provided in the coffee shop in real time while the user is drinking a beverage using a tumbler. Thus, the user feels as if the user drinks coffee there. Also, the experience in the particular environment may be maximized with the output of the content being provided changing based on the amount of beverage contained in the tumbler.

Also, a provider of the content providing apparatus according to an exemplary embodiment of the present disclosure, for example, a coffee shop, sells beverages to customers through the content providing apparatus according to an exemplary embodiment, and at the same time, allows the customers to access related contents such as music being provided in the coffee shop wherever the customer uses the content providing apparatus. That is, even customers taking beverages to go may be given the rights to access to related contents. Also, take-out sales of beverages and contents may be achieved by adjusting the rights of access (for example, a scale of output) to contents to provide, together with the consumption of beverages.

While the exemplary embodiments have been shown and described, it will be understood by those skilled in the art that various changes in form and details may be made thereto without departing from the spirit and scope of the present disclosure as defined by the appended claims.

What is claimed is:

1. A content providing apparatus comprising: a tumbler capable of containing a beverage; a sensor to measure an amount of the beverage contained in the tumbler; a content output controller configured to control a level of an output of an experience content based on the amount of the beverage measured by the sensor; and a content output apparatus configured to output the experience content with the output controlled by the content output controller, wherein the experience content is any one of a sound, an image, and lighting, of an environment or location in a real time or a particular location selected by the user that tumbler would be used, wherein the experience content is a purchased content with the beverage, wherein the content output apparatus is at least any one of a speaker, a display, and a lighting device, wherein the content output controller gradually controls the level of the output of the experience content based on the amount of the beverage measured by the sensor.

2. The content providing apparatus according to claim 1, wherein the content output controller controls the output of the experience content in proportion to the amount of the beverage remaining in the tumbler measured by the sensor.

3. The content providing apparatus according to claim 1, further comprising:

a communication unit configured to receive the experience content using a wired or wireless network and transmit the experience content to the content output apparatus.

4. The content providing apparatus according to claim 3, wherein the communication unit receives the experience content being provided in a particular environment in real time and transmits the experience content to the content output apparatus.

5. The content providing apparatus according to claim 1, wherein the experience content is related to a particular environment, and
wherein the content providing apparatus further comprises a user interface to allow a user to select the particular environment.

6. The content providing apparatus according to claim 1, wherein the display unit to provide an image of a particular environment related to the experience content.

7. A content providing method comprising: measuring, by a sensor, an amount of a beverage contained in a tumbler; determining, by a content output controller, a level of an output of an experience content based on the measured amount of the beverage measured by the sensor; and providing, by a content output apparatus, the experience content with the determined output, wherein the experience content is any one of a sound, an image, and lighting, of an environment or location in a real time or a particular location selected by the user that the tumbler would be used, wherein the experience content is a purchased content with the beverage, wherein the content output apparatus is at least any one of a speaker, a display, and a lighting device, wherein the determining the level of the output of the experience content comprises gradually changing the level of the output of the experience content based on the measured amount of the beverage.

8. The content providing method according to claim 7, wherein the gradually changing the level of the output of the experience content based on the measured amount of the beverage comprises determining the level of the output of the content in proportion to the measured amount of the beverage remaining in the tumbler.

9. The content providing method according to claim 7, further comprising:
receiving the experience content to be provided from outside using a wired or wireless network before the providing of the experience content with the determined output.

10. The content providing method according to claim 9, wherein the receiving of the experience content from the outside using the wired or wireless network comprises receiving the experience content being provided in a particular environment in real time, and
wherein the providing of the experience content with the determined output comprises outputting the received experience content.

11. The content providing method according to claim 7, wherein the experience content is related to a particular environment, and
wherein the method further comprises receiving an input for the particular environment from a user.

* * * * *